3,070,571
HEAT-TREATING RUBBER COMPOSITIONS WITH A CHLORINATED AMINE PROMOTER
Ralph A. Naylor, Plainfield, N.J., assignor to American Cyanamid Company, New York, N.Y., a corporation of Maine
No Drawing. Filed Feb. 27, 1962, Ser. No. 176,103
10 Claims. (Cl. 260—41.5)

This invention relates to the processing of elastomers and particularly to processing carbon black-elastomer mixes prior to vulcanization. More particularly it relates to a new class of promoters for improving the processing of such carbon black-elastomer mixes.

The processing of rubber to incorporate carbon black therein has been the subject of considerable investigation. It is common knowledge, for instance, that the use of a carbon black-rubber mix obtained by conventional milling only, results in a vulcanizate with a poor dispersion of carbon black therein as well as one with poor properties. Particularly is this true when a large amount of carbon black is employed. It is also known that if a milled carbon black-rubber mix is heated and masticated prior to vulcanization, that the resultant vulcanizate shows considerably better carbon black dispersion therein as well as improved properties of hardness, modulus, abrasion resistance, electrical resistance and the like. This improved method of incorporating carbon black in rubber is more fully disclosed in U.S. Patent No. 2,118,601. In addition, it has been found that the time required to obtain the desired effects of the heating and masticating treatment can be materially shortened, and the various properties of the vulcanizate still further improve by incorporating in the carbon black-rubber mix any of various agents or promoters.

It is an object of the present invention to provide an improved method for processing carbon black-rubber mixes. It is a further object of this invention to provide a vulcanizate having improved carbon black dispersion therein and having improved modulus, hysteresis, electrical and the like properties. It is a still further object of this invention to obtain such a vulcanization in a minimum of processing time using a new class of carbon black promoters.

In accordance with this invention, these objects have been met to a surprising degree by incorporating in a carbon black-rubber mix a chlorinated melamine or a chlorinated guanamine, and subjecting the resultant composition prior to vulcanization to heat and mastication. The treated mixture may then be formed into a vulcanizable stock and subjected to vulcanization.

By a chlorinated melamine according to this invention is meant melamine and melamine cyanurate in which chlorine replaces one or more of the hydrogen atoms of the —NH₂ radicals, and chlorinated alkylisomelamine in which a chlorinated alkyl group replaces one or more of the hydrogen atoms on the ring >NH groups. By a chlorinated guanamine according to this invention is meant a guanamine in which chlorine replaces one or more of the hydrogen atoms of the —NH₂ radicals, the guanamine being of the structure

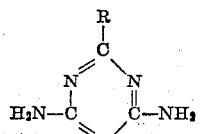

in which R represents a phenyl radical or an alkyl radical containing from 1–18 carbon atoms. Typical of the chlorinated guanamines of this invention are chlorinated acetoguanamine, lauroguanamine, 4-methylbenzoguanamine, 2-ethylbenzoguanamine and the like.

By elastomer rubber or sulfur vulcanizable rubber as employed throughout the specification and claims is meant natural rubber as well as synthetic rubber-like materials. By the latter is meant polymers of butadiene-1,3 and polymers of substituted butadienes such as methyl-2-butadiene-1,3, chloro-2-butadiene-1,3 and the like. In addition, it is intended to include copolymers formed by the copolymerization of a butadiene-1,3 with a polymerizable compound containing an olefinic linkage such as styrene acrylonitrile, methacrylonitrile, methacrylamide, isobutylene, and the like. Any of these in admixture with carbon black may be processed in accordance with this invention. A particular embodiment of the invention, however, is the processing of high carbon black-"Butyl rubber" mixes. By "Butyl rubber" is meant a vulcanizable elastic copolymer of isobutylene and a small amount of a diolefin. The practice of this invention on Butyl rubber so improves the modulus and hysteresis of the resultant vulcanizate as to render Butyl rubber attractive in fields in which heretofore it has found little, if any, use.

The carbon black employed in the method of this invention may be any carbon black. The invention is particularly concerned, however, with those carbon blacks known as rubber reinforcing blacks as distinguishable from soft rubber blacks which are non-reinforcing. By rubber reinforcing carbon blacks is meant those manufactured by the partial combustion of natural gas and/or oil and generally referred to as channel black and furnace black. The advantages of this invention are particularly significant when employing furnace black.

The amount of chlorinated melamine or chlorinated guanamine promoter employed in the present invention may be widely varied. It has been found that as little as 0.05% on the weight of the rubber will noticeably improve the properties of the vulcanizate. This may be increased to as high as 2.0% and even higher although there appears to be little added advantage gained by employing more than about 2.0%. An optimum range in accordance with this invention is about 0.5–1.5% on the weight of the rubber.

The homogenous carbon black-rubber mix employed in the method of this invention may be prepared by mixing the rubber and carbon black in conventional mixing equipment employed in the art. The amount of carbon black employed in the mix depends upon the intended use of the vulcanizate and therefore forms no part of this invention. It may vary from 25–70% by weight but generally will be in the range of 40–60%. Regardless of the carbon black content, the advantages of this method may be obtained.

When incorporating carbon black in rubber, it is desirable to employ a dispersing agent such as stearic acid or another fatty acid in accordance with conventional procedure. The promoter may be added to the rubber at any time so long as it is present in the carbon black-rubber mix during the heat treatment. Thus it may be added before, with or after the incorporation of the carbon black into the rubber. The method of this invention may be practiced on a previously plasticized rubber or one to be plasticized during the practice of this invention.

After the carbon black and promoter are incorporated in the rubber, the mix is subjected to a temperature of at least about 250° F. The desired effect is difficult to obtain at much below this. The temperature may be increased to as high as about 400° F. but preferably should not be much higher to avoid degradation of the rubber caused by extended heating at elevated temperatures. Mastication may be conducted concurrently with the heating or may be conducted subsequent thereto. The manner in which these operations are conducted forms no part of this invention and they may be carried out in conventional milling equipment.

The following examples illustrate the invention. All parts are by weight unless otherwise noted. The various properties referred to are determined by standard A.S.T.M. testing methods.

EXAMPLE 1

A master batch comprising 100 parts of Enjay Butyl 217 (2.5% isoprene, 97.5% isobutylene), 50 parts of HAF (High Abrasion Furnace Black) and 0.5 part of stearic acid is prepared. This master batch is then divided into two samples, one being used as a control and the other having 1% by weight on rubber hydrocarbon of chloroacetoguanamine added as a promoter. These are then treated in a Banbury for 10 minutes with 80 p.s.i. steam and dumped at about 200° C. Each sample is cooled and made into a vulcanizable stock by adding the following.

Compound: Parts/100 parts rubber
Zinc oxide _____ 5
Sulfur _____ 2
Tetramethyl thiuramidisulfide _____ 1
Mercaptobenzothiazole _____ 0.5

Each stock is then cured for 16 minutes at 153° C. Tests are run on the cured stocks except Mooney scorch which is run on samples of the uncured stocks. Results appear in Table I.

Table I

| Promoter | Mooney Vis. MS-4 250° F. | Mooney Scorch MS- 250° F. | Cured for 16' at 153° C. | | | |
|---|---|---|---|---|---|---|
| | | | Mod. at 300% (p.s.i.) | Tens. (p.s.i.) | Elong. percent | Vol. Resist. (ohm-cm.) |
| Control | 38 | 53 | 975 | 2,400 | 680 | 34 |
| Chloroaceto-guanamine | 38 | 24 | 1,575 | 2,550 | 520 | 3.9×10⁷ |

EXAMPLE 2

The procedure of Example 1 is repeated except that chloroacetoguanamine is replaced with trichloromelamine. Results appear in Table II.

Table II

| Promoter | Mooney Vis. MS-4 250° F. | Mooney Scorch MS- 250° F. | Cured for 16' at 153° C. | | | |
|---|---|---|---|---|---|---|
| | | | Mod. at 300% (p.s.i.) | Tens. (p.s.i.) | Elong. percent | Vol. Resist. (ohm-cm.) |
| Control | 30 | 37 | 925 | 2,100 | 610 | 37 |
| Trichloro-melamine | 36 | 30 | 1,225 | 2,250 | 540 | 21,000 |

EXAMPLE 3

The procedure of Example 1 is again repeated except that chlorinated melamine cyanurate is used as the promoter and the Mooney viscosity and scorch are measured at 268° F. Results appear in Table III.

Table III

| Promoter | Mooney Vis. MS-4 268° F. | Mooney Scorch MS- 268° F. | Cured for 16' at 153° C. | | | |
|---|---|---|---|---|---|---|
| | | | Mod. at 300% (p.s.i.) | Tens. (p.s.i.) | Elong. percent | Vol. Resist. (ohm-cm.) |
| Control | 21 | 21 | 800 | 2,275 | 700 | 17 |
| Chlorinated Melamine Cyanurate | 32 | 11 | 1,175 | 2,275 | 520 | 2×10⁵ |

EXAMPLE 4

The procedure of Example 3 is repeated using as promoters the compounds listed in Table IV. Results appear in Table IV below.

Table IV

| Promoter | Mooney Vis. MS-4 268° F. | Mooney Scorch MS- 268° F. | Cured for 16' at 153° C. | | | |
|---|---|---|---|---|---|---|
| | | | Mod. at 300% (p.s.i.) | Tens. (p.s.i.) | Elong. percent | Vol. Resist. (ohm-cm.) |
| Control | 32.5 | 21 | 775 | 2,300 | 700 | 9 |
| Tetrachloro-melamine | 35 | 12 | 1,250 | 2,250 | 500 | 1×10³ |
| Hexachloro-melamine | 36 | 13 | 1,175 | 2,200 | 540 | 6×10⁴ |
| Chlorobenzo-guanamine | 36 | 22 | 900 | 2,225 | 650 | 12,000 |
| Chlorolauro-guanamine | 37 | 13 | 1,175 | 2,375 | 580 | 22,000 |
| Chloromethyl-isomelamine | 35 | 13 | 1,100 | 2,175 | 570 | 1.3×10⁷ |

This is a continuation-in-part of my copending application Serial No. 750,305, filed July 23, 1958, now abandoned.

I claim:

1. In a method for producing a high carbon black content rubber vulcanizate which comprises forming a vulcanizable carbon black rubber composition having incorporated therein a suitable promoter of reaction between the carbon black and the rubber; subjecting said composition to a temperature of from about 250° to about 400° F. and to mastication; and vulcanizing the resultant composition; the improvement which consists in using as said promoter a member of the group consisting of chloroalkylisomelamine in which chlorine is attached to a carbon linked to a ring nitrogen and chlorinated melamine, chlorinated melamine cyanurate and chlorinated guanamines of the formula

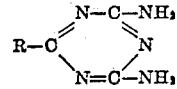

wherein R is selected from phenyl and alkyl of 1 to 18 carbon atoms, in which chlorine replaces at least one hydrogen of an —NH₂ group.

2. A method according to claim 1 in which the rubber is a vulcanizable copolymer of isobutylene and a copolymerizable diolefin.

3. A method according to claim 1 in which the promoter is chlorinated melamine cyanurate.

4. A method according to claim 1 in which the promoter is chlorinated methylisomelamine.

5. A method according to claim 1 in which the promoter is hexachloromelamine.

6. A method according to claim 1 in which the promoter is a chlorinated guanamine.

7. A method according to claim 6 in which the guanamine is acetoguanamine.

8. A method according to claim 6 in which the guanamine is lauroguanamine.

9. In a method for producing a high carbon black content rubber vulcanizate which comprises forming a vulcanizable carbon black rubber composition having incorporated therein a suitable promoter of reaction between the carbon black and the rubber; subjecting said composition to a temperature of from about 250° to about 400° F. and to mastication; and vulcanizing the resultant composition; the improvement which consists in using as said promoter chlorinated melamine.

10. A rubber vulcanizate prepared by forming a vulcanizable carbon black rubber composition having incorporated therein a suitable promoter of reaction between the carbon black and the rubber; subjecting said composition to a temperature of from about 250° to about 400° F. and to mastication; and vulcanizing the resultant composition; said promoter being chlorinated melamine.

No references cited.